(12) United States Patent
Fedorovskaya et al.

(10) Patent No.: US 7,809,197 B2
(45) Date of Patent: Oct. 5, 2010

(54) METHOD FOR AUTOMATICALLY DETERMINING THE ACCEPTABILITY OF A DIGITAL IMAGE

(75) Inventors: Elena A. Fedorovskaya, Pittsford, NY (US); James R. Niederbaumer, Webster, NY (US); Lorrie Claver, legal representative, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 1381 days.

(21) Appl. No.: 11/008,437

(22) Filed: Dec. 9, 2004

(65) Prior Publication Data
US 2006/0126093 A1 Jun. 15, 2006

(51) Int. Cl.
*G06K 9/48* (2006.01)
(52) U.S. Cl. .................. 382/199; 382/154; 358/1.14
(58) Field of Classification Search .............. 382/199, 382/154; 358/1.14
See application file for complete search history.

(56) References Cited

U.S. PATENT DOCUMENTS

| 5,659,639 | A | * | 8/1997 | Mahoney et al. ............ 382/309 |
| 5,694,484 | A | | 12/1997 | Cottrell et al. |
| 6,018,397 | A | | 1/2000 | Cloutier et al. |
| 6,018,590 | A | * | 1/2000 | Gaborski .................... 382/168 |
| 6,028,676 | A | | 2/2000 | Nakao |
| 6,282,317 | B1 | * | 8/2001 | Luo et al. ................... 382/203 |
| 6,535,636 | B1 | | 3/2003 | Savakis et al. |
| 6,547,456 | B2 | * | 4/2003 | Wechsler et al. ............ 396/422 |
| 6,636,216 | B1 | * | 10/2003 | Silverbrook et al. ......... 345/427 |
| 6,636,648 | B2 | | 10/2003 | Loui et al. |
| 6,671,405 | B1 | | 12/2003 | Savakis et al. |
| 6,697,502 | B2 | | 2/2004 | Luo |
| 6,738,494 | B1 | | 5/2004 | Savakis et al. |
| 6,748,097 | B1 | | 6/2004 | Gindele et al. |
| 7,522,777 | B2 | * | 4/2009 | Tsukui ....................... 382/240 |
| 2003/0118245 | A1 | * | 6/2003 | Yaroslavsky et al. ........ 382/255 |
| 2004/0100567 | A1 | | 5/2004 | Miller et al. |

(Continued)

FOREIGN PATENT DOCUMENTS

EP 1280 340 A2 1/2003

(Continued)

OTHER PUBLICATIONS

Satoh Y. et al., "Automatic Detection of Blurred Images for Photofinishing" Journal of Imaging Technology, Soc. for Image Science and Technology, Springfield, VA, US, vol. 16, No. 5, Oct. 1, 1990, pp. 186-188, XP000167936, abstract.

(Continued)

*Primary Examiner*—Daniel G Mariam
*Assistant Examiner*—Aklilu K Woldemariam
(74) *Attorney, Agent, or Firm*—Robert Luke Walker; Christopher J. Whitz

(57) ABSTRACT

A method for automatically determining the acceptability of an input image for a predetermined output operation, such as printing, includes the steps of: (a) identifying one or more important areas in the input image; (b) calculating a salient acceptability feature for each of the important areas; (c) determining the acceptability of the input image from the salient acceptability features of the important areas; and (d) implementing the predetermined output operation based on the acceptability of the input image determined in step (c).

26 Claims, 5 Drawing Sheets

U.S. PATENT DOCUMENTS

| | | |
|---|---|---|
| 2004/0103111 A1 | 5/2004 | Miller et al. |
| 2005/0093998 A1* | 5/2005 | Haas et al. ............... 348/231.2 |
| 2005/0162520 A1* | 7/2005 | Karasaki et al. .......... 348/207.2 |

FOREIGN PATENT DOCUMENTS

| | | |
|---|---|---|
| EP | 1 400 923 A2 | 3/2004 |
| EP | 1 411 469 A2 | 4/2004 |

OTHER PUBLICATIONS

"Theory of Edge Detection", Proceedings of the Royal Society of London, vol. B207, pp. 187-217, 1980.

"A Computational Approach to Edge Detection", by J.F. Canny, IEEE Transactions on Pattern Analysis and Machine Intelligence, 8, pp. 769-798, 1986.

The Reproduction of Color, $5^{th}$ Edition, by R.W.G. Hunt, Fountain Press, England, 1995.

G.T. Buswell in the paper entitled "How People Look at Pictures: A Study of the Psychology of Perception in Art", The University of Chicago Press, Chicago, 1935.

Luo, Gray and Lee in the paper "Towards Physics-based Segmentation of Photographic Color Images," Proc. IEEE Int. Conf. Image Process., 1997.

* cited by examiner

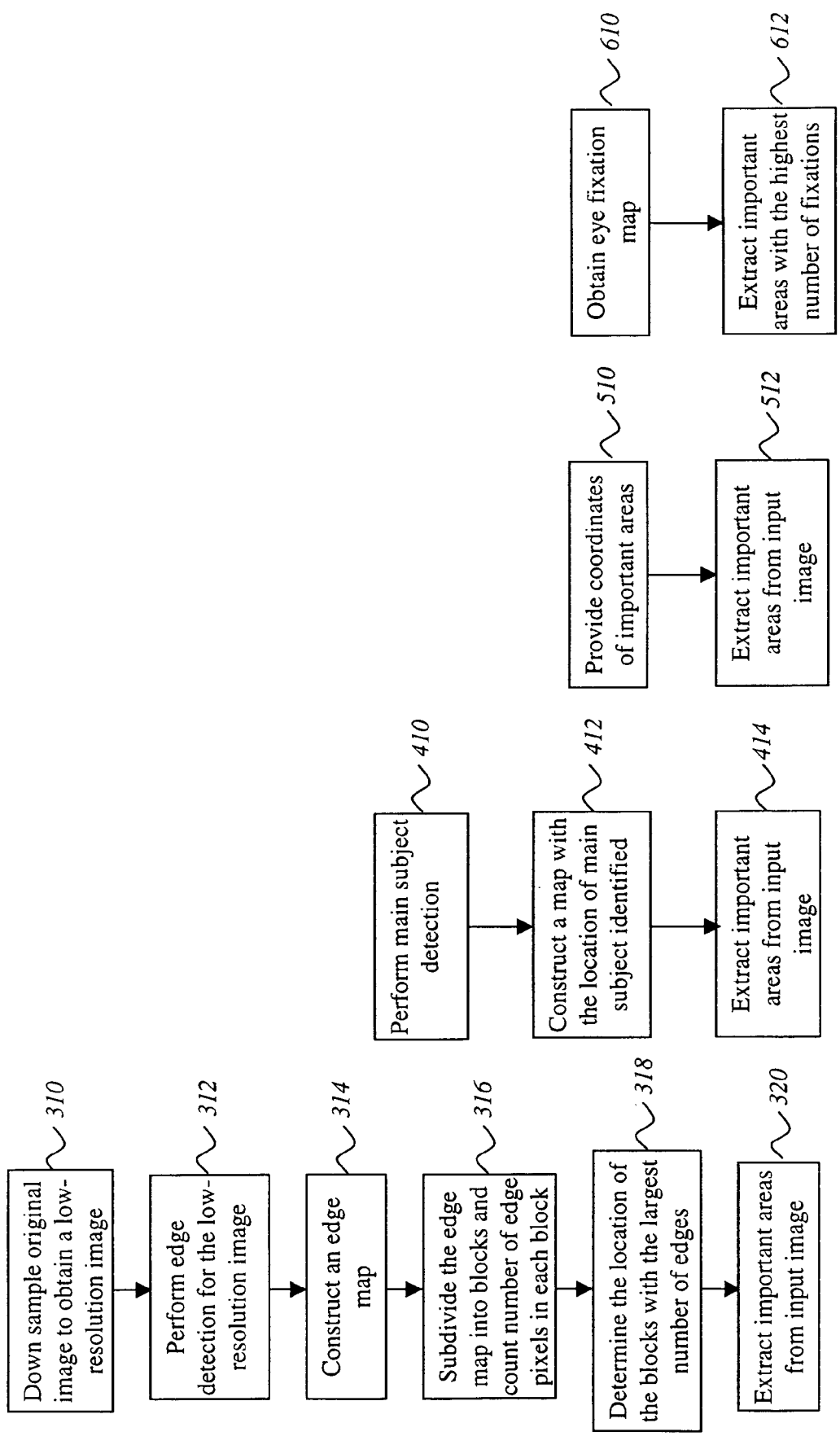

METHOD FOR AUTOMATICALLY DETERMINING THE ACCEPTABILITY OF A DIGITAL IMAGE

FIELD OF THE INVENTION

The invention relates to the field of digital image processing and more specifically to a method for automatically determining acceptability of a digital output image.

BACKGROUND OF THE INVENTION

Among images that are captured using conventional or digital cameras, as well as other conventional imaging devices, such as medical imaging devices, there are pictures that fall below customer requirements for an acceptable quality level. For example, it has been found that among all color negative frames of film that are submitted to photofinishers, there are some negatives that produce, when printed, very poor quality prints.

Depending on the local salability policies and agreements with customers around quality standards specifications, such images frequently cannot be sold to the customers. There usually are several categories of such prints. For example, one category is referred to as a "dud" category, comprising mainly blank images, severely underexposed or overexposed images, and images of extremely poor focus. Other categories may include images where the main subject is not properly positioned, such as when a person's head is cut off and/or eyes are not visible, or where the images are only moderately unsharp or noisy but nonetheless unacceptable. Additionally, some images captured with a digital camera may have very poor sharpness, which may not be easily detectable by a user observing the image, e.g., on a preview screen on the camera, prior to submitting the images for printing. Also, certain medical images suffer from low sharpness and other problems, such as noise, and cannot be used by a radiologist for a medical examination. In that case, it would be advantageous to identify the problem in a timely fashion so that the image can be re-taken, in a manner conveniently for the patient.

In all described examples, detecting images with unacceptable sharpness levels is a useful operation that can result in cost and time saving benefits.

Current methods for detecting unacceptable images primarily rely on visual inspection of each photograph. Identifying those images automatically will provide a cost benefit to photofinishers as well as users who print their images at home or via an on-line service.

In U.S. Pat. No. 6,028,676, entitled "Output Method and Apparatus for Estimating Image Quality Prior to Output" and issued in the name of Nakao on Feb. 22, 2000, the disclosed method deals with the problem of data transfer from a host computer to a printer, where the quantity of image data is substantial and the printer may have insufficient memory to store all the data. The method therefore sets out to estimate the resultant effect on image quality before the print data is transferred to the printer. In this case, the file size can be an indicator of a potential problem, e.g., whether an initial high-resolution image, if printed, would have inferior quality. Based on such estimation, an output apparatus and method determines in advance whether to transfer the data for printing, print the data or provide a display to an operator indicating that an output image will be of inferior quality. The method thus intends to account for the memory limitations of the printing device, which can have adverse effects on the output image quality. Consequently, while it is assumed that the limitations of the printing process may preclude an input image from being output with sufficient quality, the disclosed method is not suitable for differentiating the images in terms of their original quality. Hence, it cannot be used to prevent potentially wasteful images from being printed, as potentially wasteful images of low original quality will still be printed if printer memory is sufficient.

U.S. Pat. No. 6,018,397, entitled "Digital Image Processing with Indication to User of Hardcopy Output Image Quality" and issued in the names of Cloutier and Wheeler on Jan. 25, 2000, discloses a method for establishing a boundary level of acceptable hardcopy print quality level. This method involves determining quality based on selected image print size and printing magnification and provides a warning to the user prior to generation of the hardcopy print that alerts the user when the determined print image quality will be unsatisfactory. Similar to the aforementioned U.S. Pat. No. 6,028,676 described above, this method is not intended to predict an output print acceptability based on the variable quality of an input image, but rather, assumes a high level of input quality and considers the user-selected magnification level and desirable image size as factors that may lead to unsatisfactory print quality.

In U.S. Pat. No. 5,694,484, entitled "System and Method for Automatically Processing Image Data to Provide Images of Optimal Perceptual Quality" and issued in the names of Cottrell et al. on Dec. 2, 1997, an image processing system automatically optimizes the perceptual quality of images undergoing a series of selected image-processing operations. The system takes into consideration profiles of sources from which the images are generated, profiles of intended applications, and the impact that image processing operations (individually or in concert) will have on perceived image quality. The described system uses a body of relationships linking human perception of image quality with objective metrics (such as sharpness, grain, tone and color) to vary a collection of adjustable parameters in the requested image-processing operations in order to automatically maximize image quality for resulting pictures. By controlling a collection of parameters in the requested image processing operations, it works automatically to maximize subjective quality for the resulting picture. However, although input images are optimized during the processing phase for their quality, the disclosed system does not assess the original input quality against agreed upon standards of acceptability to determine whether the original should be treated differently at the stage of output, that is, whether the original is even worthy of processing and output as a print in the first place.

In commonly assigned U.S. Pat. No. 6,535,636, entitled "A Method for Automatically Detecting Digital Images that are Undesirable for Placing in Albums" and issued in the names of Savakis and Loui on Mar. 18, 2003, and which is incorporated herein by reference, a method is disclosed for automatically classifying a digital image as a dud (or a wasteful image). This method is based on computational assessment of several image properties, including the sharpness, contrast, noise, and exposure of digital images, either individually or in combination. For the contrast-related assessment, a measure of a standard deviation of the intensity histogram extracted from the edge profile is used, while for the noise-related assessment, a standard deviation of pixels from a part of the image is used. With respect to sharpness-related assessment, the method includes obtaining an edge profile of the image, computing a histogram from the edge profile, locating predetermined edges of the edge histogram, and computing a centroid of gradients of the predetermined edges to determine a mean value of the edge gradient. Dud images due to unacceptable sharpness are therefore identified using a measure of the edge strength. One might anticipate however, that there are images with somewhat weak edges that can still be acceptable, such as scenes with water and sky, or images that are not extensively blurred. Conversely, there are images with strong edges in one local area, which still possess very low quality if the rest of the image is grossly unsharp, especially where the primary subject is unsharp. In these cases, the suggested measure may not perform very well. Another shortcoming of the disclosed method is the necessity to apply different measures, such as contrast or underexposure estimation, when the edge degradation occurs as a secondary problem because of severe under- or over-exposure. In these cases, observers may perceive the edges as blurry and report them as such; however, the sharpness measure in terms of the edge gradient estimation is not sufficient to determine the acceptability of the image.

Consequently, a need exists to develop a more reliable method for automatic determination of the acceptability of digital images, especially those which are submitted for printing, and in particular because of a problem with sharpness.

SUMMARY OF THE INVENTION

It is an object of the invention to develop a more reliable method for automatic determination of the acceptability of digital images. It is a further object of the invention to develop a more reliable method for automatic determination of the acceptability of digital images which are submitted for printing, in particular because of a problem with sharpness.

The present invention is directed to overcoming one or more of the problems set forth above. Briefly summarized, according to one aspect of the invention, the invention resides in a method for automatically determining the acceptability of an input image for a predetermined output operation. The method comprises the steps of: (a) identifying one or more important areas in the input image; (b) calculating a salient acceptability feature for each of the important areas; (c) determining the acceptability of the input image from the salient acceptability features of the important areas; and (d) implementing the predetermined output operation based on the acceptability of the input image determined in step (c).

In a further aspect, the invention resides in a system for automatically determining the acceptability of an input image for a predetermined output operation, where the system comprises: an input stage for identifying one or more important areas in the input image; a processing stage for (a) calculating a salient acceptability feature for each of the important areas and (b) determining the acceptability of the input image from the salient acceptability features of the important areas; and an output stage for implementing the predetermined output operation based on the acceptability of the input image determined in the processing stage.

The technical advantage of the present invention is that it provides the means for detecting unacceptable images due to poor focus occurring at capture, as well as extreme over- and underexposure, each of which affects edge characteristics, and allows an improved and more accurate identification of those prints compared to the existing algorithms. The method provides both high accuracy of detecting unacceptable images and a low level of false alarms, which largely eliminates the necessity for visual inspections and offers a cost saving benefit for photofinishers, as well as consumers who print their images at home or via an on-line service.

BRIEF DESCRIPTION OF THE DRAWINGS

FIG. 4A is a flow diagram illustrating further detail of the method for identifying and extracting important areas in the image, as shown in FIG. 3.

FIG. 4B is a flow diagram illustrating an additional embodiment of the method for identifying and extracting important areas in the image, as shown in FIG. 3.

FIG. 4C is a flow diagram illustrating an additional embodiment of the method for identifying and extracting important areas in the image, as shown in FIG. 3.

FIG. 4D is a flow diagram illustrating an additional embodiment of the method for identifying and extracting important areas in the image, as shown in FIG. 3.

DETAILED DESCRIPTION OF THE INVENTION

In the following description, the present invention will be described in the preferred embodiment as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described therein, may be selected form such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example, magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. It is also instructive to note that the images are either directly input into the computer system (for example by a digital camera) or digitized before input into the computer system (for example, by scanning an original, such as a silver halide film).

Figure 1:
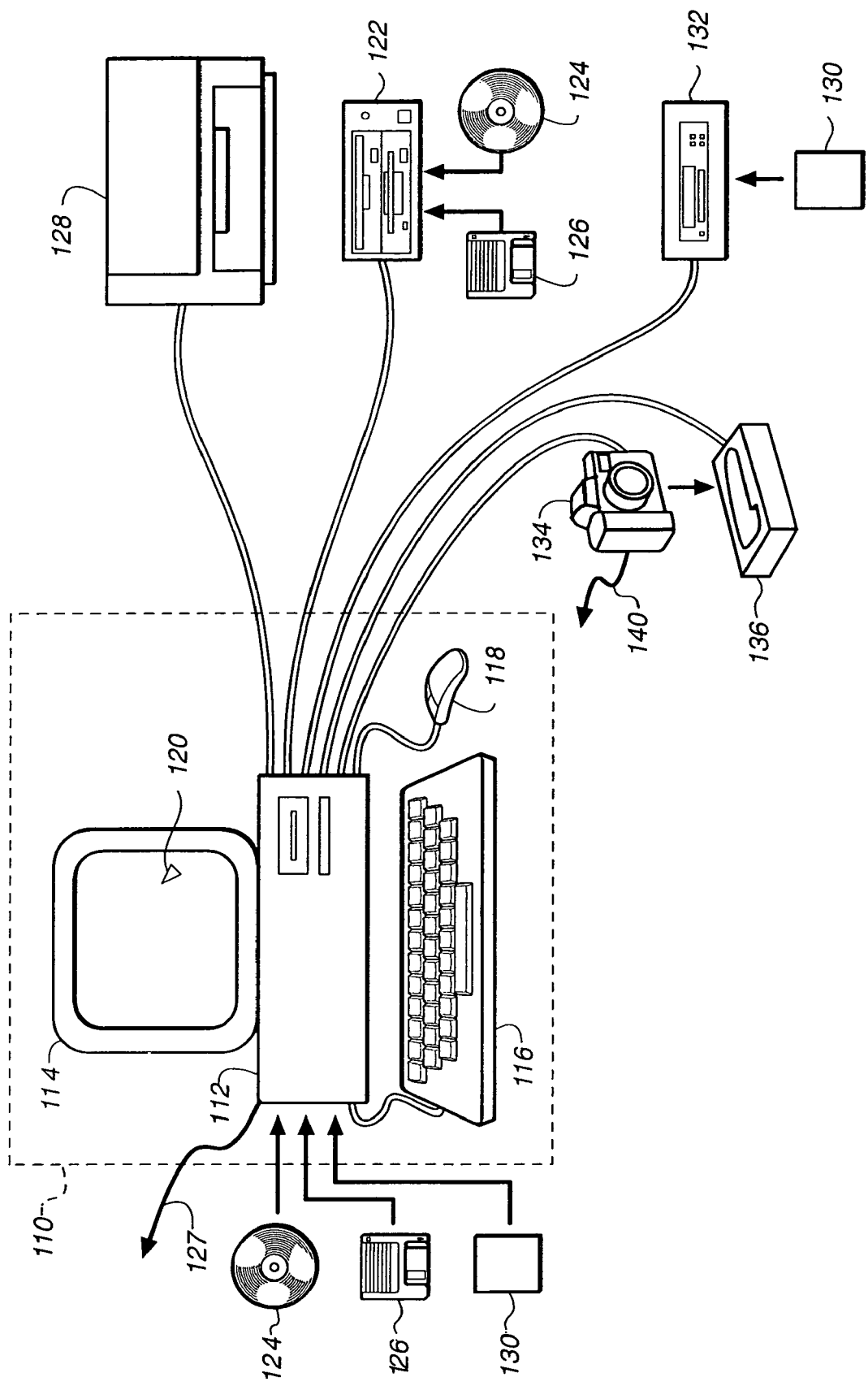
FIG. 1 is a perspective diagram of a computer system for practicing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit 112 for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 20 for printing a hardcopy of the output of the computer system 110. It should be noted, that the printer 128 may be a desktop printer, such as inkjet or a laser printer, or a sophisticated photofinishing printing device adapted to produce photographic prints in retails stores, kiosks, online or wholesale photographic industry.

Images may also be displayed on the display 114 via a personal computer card (PC card) 130, such as, as it was formerly known, a PCMCIA-card (based on the specifications of the Personal Computer Memory Card International Association), which contains digitized images electronically embodied in the card 130. The PC card 130 in inserted into the microprocessor-based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127 may have been obtained from a variety of sources, such as a digital camera 134 or a scanner (not shown).

Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm may be stored in any of the storage devices heretofore mentioned and applied to images in order to automatically determine their acceptability for a predetermined output operation, e.g., to determine their acceptability with respect to sharpness based on automatically computing a measure of the edge density in the images.

The specific algorithm, such as a method for automatically determining the acceptability of a digital image, disclosed in the preferred embodiment of the present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), medical imaging systems, mobile devices (e.g., PDA or cell phone that can be used as a processing unit, a display unit, or a unit to give processing instructions), and as a service offered via the World Wide Web.

In each case, the algorithm for automatically determining the acceptability of a digital image may stand alone or may be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm may interface with a variety of workflow user interface schemes.

The algorithm disclosed herein in accordance with the invention of a method for automatically determining the acceptability of a digital image, may have interior components that utilize various data detection and reduction techniques, such as face detection, skin detection, people detection, other object detection, essential for interpreting the scene depicted on an image, for example, a birthday cake for birthday party pictures, or characterizing the image, such as in the case of medical images capturing a specific body part).

The present invention is primarily designed as a method to detect images having poor sharpness that have been produced from color negative film prior to their output as printed images in order to eliminate unwanted prints from the printing process, thus providing a cost benefit for photofinishers. However, as has been explained, this method can be used in a variety of user contexts and environments. In just a few additional contexts, this method could be used to assess images originated from color reversal film, digital cameras of all kinds, radiographic image sources, and other digital imaging equipment, such as original digital graphics.

Sharpness within the scope of this invention is defined as the property of an image to carry a sufficient number of sharp edges. The criterion of sufficiency can be empirically determined by considering a variety of images, which include images of acceptable as well as unacceptable quality. Such a definition allows interpreting and consequently identifying several groups of low quality images as being unacceptable because of sharpness: typically these groups include images having very poor focus, completely or mostly blank images, and severely under- and over-exposed images. All of these image groups lack sharp edges.

In order to locate edges in an image, several standard edge detection methods can be employed. Those techniques identify the transitions points between regions with relatively distinct gray-level properties (interpreted as edges) by computing a local derivative operator. The local derivative operator, depending on the implementation, approximates a gradient (such as a Sobel operator), or Laplacian (such as Marr and Hildreth algorithm, described in the article entitled "Theory of Edge Detection", *Proceedings of the Royal Society of London*, vol. B207, pp. 187-217, 1980, which is incorporated herein by reference) at a given pixel or position in an image.

Another edge detection algorithm that provides robust detection performance is Canny's edge detection algorithm. This algorithm is described in an article entitled "A Computational Approach to Edge Detection", by J. F. Canny, *IEEE Transactions on Pattern Analysis and Machine Intelligence*, 8, pp. 769-798, 1986, which is incorporated herein by reference. Canny uses first-order differential operators at several different orientations rather than a single second-order differential operator to determine local maxima of the gradient. Additionally, the Canny algorithm selects strong edges, and only those weak edges that are connected to the strong ones. This advantageous characteristic of Canny's method allows better differentiation between the true weak edges and the noise, compared to the above-mentioned edge detection techniques.

Figure 2:
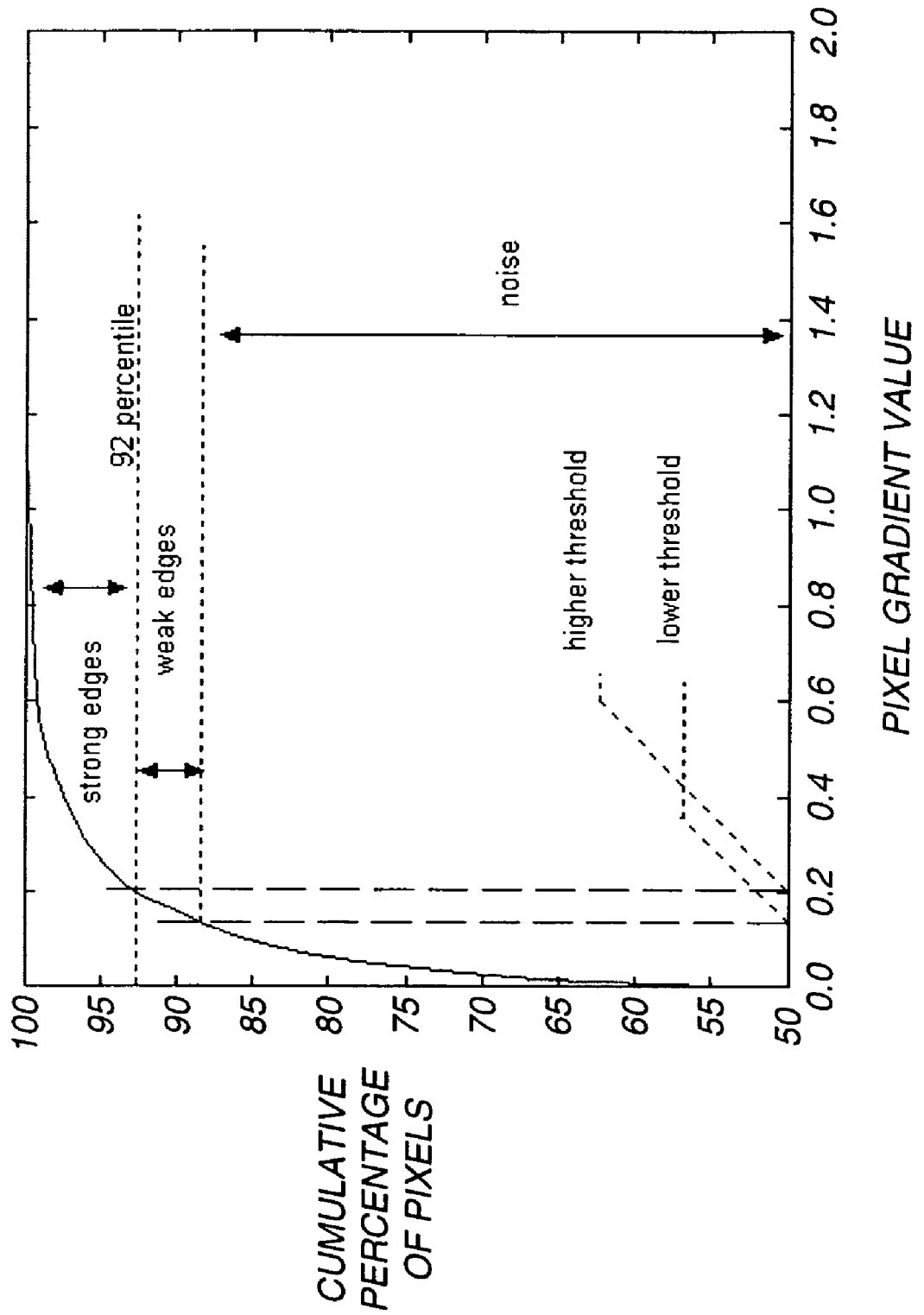
FIG. 2 illustrates the selection of thresholds for edge detection.

In order to provide successful edge detection, several parameters must be optimized, namely, the gradient thresholds. These thresholds determine which pixels in an image represent true edges, strong and weak, and which pixels are considered as noise. The higher threshold of the gradient is used to only consider edges with the relatively high gradient, for example, higher than the 92nd percentile. To include some weaker edges connected to the strong edges, a lower threshold is used, such as, for example, 0.75 of the value for the higher threshold. These considerations are illustrated in FIG. 2.

One implementation of the Canny edge detection method can be found in the well-known software package "Matlab". In this implementation, Canny's edge detection is performed over the "intensity" image, where the pixel values are ranging from 0 to 1. One way to obtain such an intensity image is to normalize the image pixel values to the maximum pixel value found in the initial image. Another way is to represent the image in some perceptually relevant form that actually reflects the perceived "intensity" of the pixels. This can be done, for example, by converting the digital image into the L* values, where the L* representation is known in the literature as an approximation of the perceptually uniform lightness scale.

The L* values are computed according to the CIE 1976 formula: $L^* = 116(Y/Y_w)^{1/3} - 16$, where Y and $Y_w$ are the Y tristimulus values of a given pixel and the reference white being used. For values of $Y/Y_w$ less than 0.008856, L* is calculated by the formula $L^* = 903.3(Y/Y_w)$. More information on the formulae being used can be found in *The Reproduction Of Colour*, 5th edition, by R. W. G. Hunt, Fountain Press, England, 1995. The usage of the L* representation allows detection of features, such as edges, that are relevant or expressed in terms relevant to perception.

It should also be noted that other representations can readily be used with respect to the edge detection algorithms, including without limitation such representations as a normalized r, g, and b image, the green channel of an image, a luminance image, an image expressed in relative printing densities or an image expressed in printing code values. In each case, the thresholds and parameters appropriate to the image representation space are selected.

Figure 3:
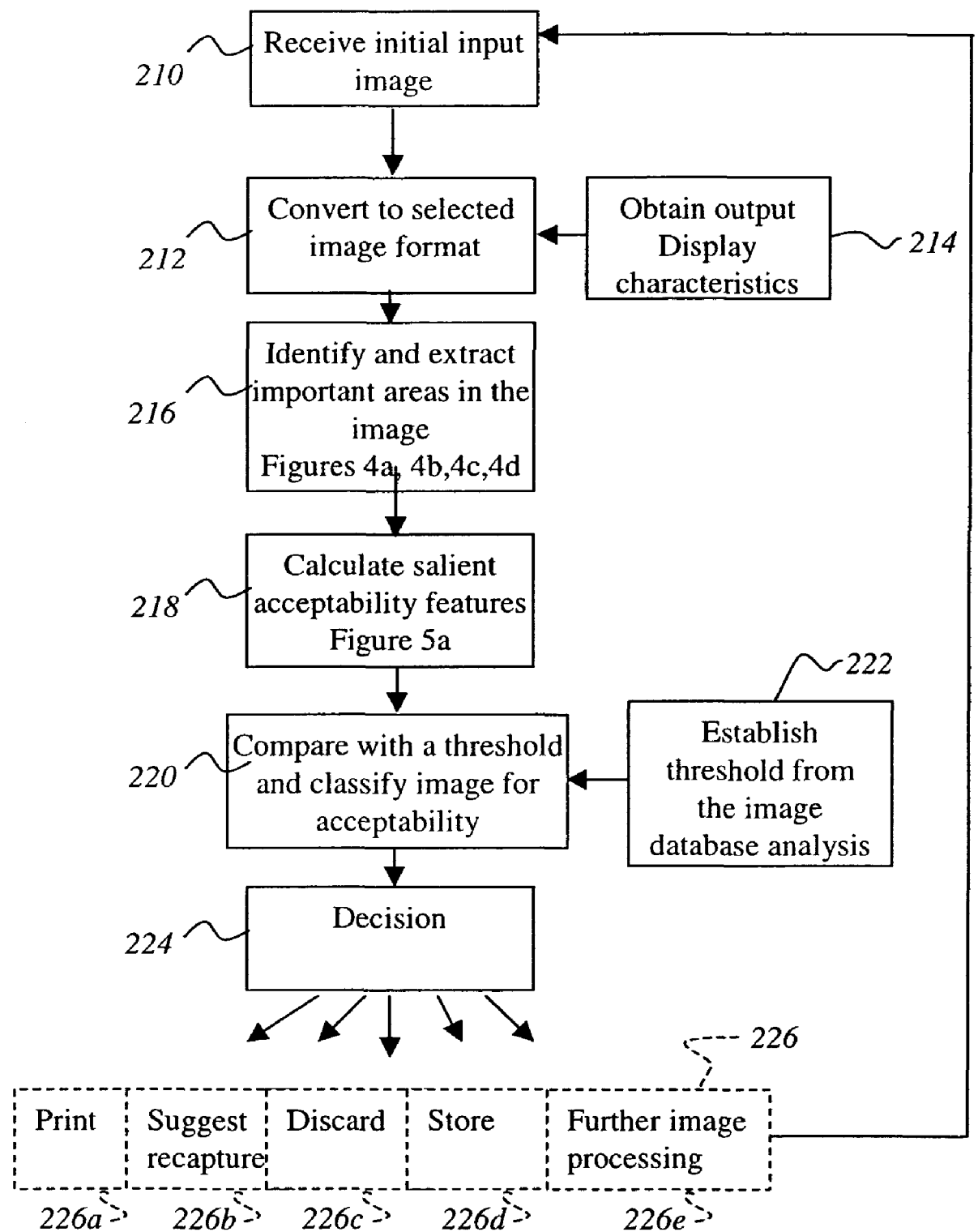
FIG. 3 is a flow diagram illustrating a preferred embodiment of the invention.

Referring now to FIG. 3, the flowchart shown therein illustrates the operation of the method according to the invention for determining acceptability of one or more images based on computing a salient acceptability feature, e.g. an edge occurrence measure, which is extracted from important areas in an image.

As shown in step 210, the method is initiated by receiving an image in digital form, which will be generally referred to hereafter in the present description as the input image. Next, the input image is converted to a preferred format for further processing (step 212). In the preferred embodiment, the preferred format is an estimation of lightness, L*, that is computed according to the CIE 1976 formula using the method discussed above and information about the output display characteristics (step 214), wherein the display can be a monitor screen, a printed paper system or some other display system with known characteristics. In an alternative embodiment, the conversion of the image to the lightness scale in the steps 212 and 214 may be omitted or replaced by conversion into a different format, such as normalized r,g,b, relative printing densities, or other formats as mentioned previously. In each case, the analysis described in the subsequent steps is performed within the selected format.

In step 216, the important areas in the image are identified and extracted for further analysis. Note that the processing occurring in step 216 is shown in greater detail in FIG. 4A for a preferred embodiment, and in FIGS. 4B-4D for alternative embodiments.

Referring now to FIG. 4A, the detailed processing that occurs in step 216 pertaining to the identification of the important areas in the input image is shown. The method illustrated here is based on the assumption that regions containing important information for determining the output acceptability possess the largest number of the sharpest edges. In step 310, the input image is down-sampled to obtain a low-resolution image for analysis. The down sampling can be performed using any available interpolation method. The preferred embodiment uses a 4×4 block averaging technique. The down sampling advantageously reduces the processing time and removes noise, which often is an impeding factor for the edge detection.

Next, the low-resolution analysis image is subjected to the edge detection algorithm (step 312), such as the Canny method. As mentioned previously, the Canny edge detection method employs one or more optimized thresholds. Such thresholds are tailored to the situation and may take on a variety of values without limitation as to the coverage of the invention. In the preferred embodiment, a higher threshold of the gradient is set to consider only those edges with a relatively high gradient (e.g., above $92^{nd}$ percentile). In addition, a lower threshold is used to include some weaker edges connected to the strong edges (e.g., where the lower threshold is 75% of the value for the higher threshold).

In an alternative embodiment, these thresholds may be dependent upon the image noise. In this case, when the image has a higher noise level, the thresholds will be adjusted to capture a smaller fraction of the edges, which will presumably prevent an erroneous detection of many noisy edge pixels. In yet another alternative embodiment, a smoothing filter can be applied to the low-resolution analysis image (or the input image) prior to edge detection in order to reduce the noise. In this case, a parameter of such a filter could be adjusted based on the noise level. One example of a commonly used filter is a Gaussian blur filter, where the value of the standard deviation may be adjusted depending on the noise.

Based on the pixel-related edge data from the preceding step(s), an edge map is constructed as shown in step 314. This edge map is then subdivided into a predetermined number of blocks (in step 316), for example an array of 8×8 blocks, and the number of edge pixels in every block is then counted. Next, blocks with the largest number of edge pixels are identified. In the preferred embodiment, the locations of the top three blocks (step 318) are identified. It should be noted that although the optimum number of blocks (three) was determined by examining a large database of images, a different number of blocks, e.g. two blocks or more than three blocks, could also be used. Other blocks can also be added for further analysis. For example, the block containing the edge pixel with the maximum gradient value among all edge pixels represented in the edge map can be additionally selected. Alternatively (or additionally), a central portion of the image can also be included by constructing a block around the central point, with the assumption that the central area of the image typically contains the main subject of the photograph.

In step 320, the locations of the blocks identified in the low-resolution image are then used to select similarly-located blocks in the full resolution input image in order to extract important areas for further processing. In the preferred embodiment, a total number of three sample areas are selected in the input image, each with the same size of ⅛×⅛ of the input image. These sample areas correspond to the three blocks identified in step 318. The position of these areas in the input image is determined by converting coordinates of the appropriate blocks in the low-resolution image to the corresponding coordinates in the input image. As previously described, additional images areas can be extracted, such as the block containing the maximum gradient pixel or the central block.

While the enabling embodiment uses the assumption that sharp edges identify important image areas, alternative methods can be used to identify some or all of the segments containing important information in a photograph. For instance, an algorithm which detects the main subject in an image can be used (as shown in FIG. 4B), since often the rendering of the main subject is what influences the acceptability of a printed image most. One such algorithm is disclosed in commonly assigned U.S. Pat. No. 6,282,317, entitled "Method for Automatic Determination of Main Subjects in Photographic Images" and issued Aug. 28, 2001 in the names of Luo et al., the disclosure of which is incorporated herein by reference. This algorithm automatically detects main subjects in photographic images by identifying flesh, face, sky, grass, etc. as semantic saliency features together with "structural" saliency features related to color, texture, brightness, etc., and then combining those features to generate belief maps.

Another useful image processing technique for selecting areas for further acceptability determination is disclosed in commonly-assigned U.S. Pat. No. 6,697,502, entitled "Image Processing Method for Detecting Human Figures in a Digital Image" and issued on Feb. 24, 2004 in the name of Luo, the disclosure of which is incorporated herein by reference. This method provides detection of human figures in a digital color image. The algorithm first performs a segmentation of the image into non-overlapping regions of homogeneous color or texture, with subsequent detection of candidate regions of human skin color and candidate regions of human faces; and then for each candidate face region, constructs a human figure by grouping regions in the vicinity of the face region according to a pre-defined graphical model of the human figure, giving priority to human skin color regions.

With regard to main subject detection. FIG. 4B shows an alternative embodiment wherein the important areas in the input image are identified using the main subject detection algorithm described above. As shown in step 410, the input image is processed by the main subject detection algorithm described in the above-cited U.S. Pat. No. 6,282,317. Alternatively, the main subject can be identified by using the low-resolution image to reduce the processing time. In this case, the input image is down-sampled to obtain a low-resolution image for analysis, similarly to step 310 of FIG. 4A. Consequently, a map is created and the region corresponding to the location of the main subject of the photograph is identified (step 412) in the map. (Note that, unlike in the preferred embodiment, it is not necessary to divide the map into blocks.) In step 414, the input image is further analyzed by extracting the important areas, which correspond to the identified location of the main subject. Alternatively, when the entire processing is performed over the low-resolution image, the important areas containing the main subject are extracted from the low-resolution image.

Yet in another alternative embodiment of this portion of the method employed in step 216, important areas can be identified by other methods, such as, for example, by providing information about positions of those areas (as shown in FIG. 4C). This information can be provided by deriving coordinates of one or more important areas (step 510), e.g., by manually clicking on the regions of the displayed image or outlining those regions, etc. or automatically by pre-specifying the coordinates of the regions. These important areas are then extracted from the input image in step 512. This method can be particularly useful in medical imaging.

Still in another alternative embodiment illustrated in FIG. 4D, the important areas can be identified by using monitoring of eye fixations of the user when he or she views the image. The relationship between frequency and duration of eye fixations in different areas in an image and their subjective importance was demonstrated in several studies. Thus, G. T. Buswell in the paper entitled "How People Look at Pictures: A Study of The Psychology of Perception in Art", The University of Chicago Press, Chicago, 1935, and A. L. Yarbus, "Eye Movements and Vision" (B. Haigh, Trans.), Plenum Press, New York, 1967 revealed that individuals primarily fixated their eyes on what they believed to be the important elements of a photograph or painting. This research indicates that the importance of scene elements to a user may be ascertained by capturing their eye fixations, and using the frequency of occurrence and/or duration of fixations on particular objects within a scene. The method and the system for capturing eye fixations while taking pictures with a digital camera is described in commonly-assigned U.S. Pat. Application Publication No. U.S. 2004/0103111 A1, entitled "Method and Computer Program Product for Determining an Area of Importance in an Image Using Eye Monitoring Information" and Published May 27, 2004, and U.S. Patent Application Publication No. US2004/0100567 A1, entitled "Camera System with Eye Monitoring" and published May 27, 2004, both disclosures of which are incorporated herein by reference. Similarly, eye gaze tracking has been proposed for use in monitoring consumer reactions to a scene presented on a screen of a display; one example of this is in the usage of the Blue Eyes camera sold by International Business Machines, Armonk, N.Y., U.S.A.

Referring now to FIG. 4D, an eye fixation map is obtained based on the eye gaze tracking (step 610). Next, the areas with the highest number of eye fixations are identified. One method of identifying such areas could be based on first, subdividing the input image into a number of rectangular blocks, and subsequently identifying the locations of blocks with the highest number of eye fixations. Alternatively, the image can be initially segmented using an unsupervised clustering technique, suggested by Luo, Gray and Lee in the paper "Towards Physics-based Segmentation of Photographic Color Images," *Proc. IEEE Int. Conf. Image Process.*, 1997, which is incorporated herein by reference. Subsequently, the number of eye fixations is counted for each of the obtained segments, and the top segments are then identified and extracted as the important areas of the image (step 612). Analogously, important areas can be identified based on the fixation duration rather than their frequency, or a combination of both signals.

Figure 6:
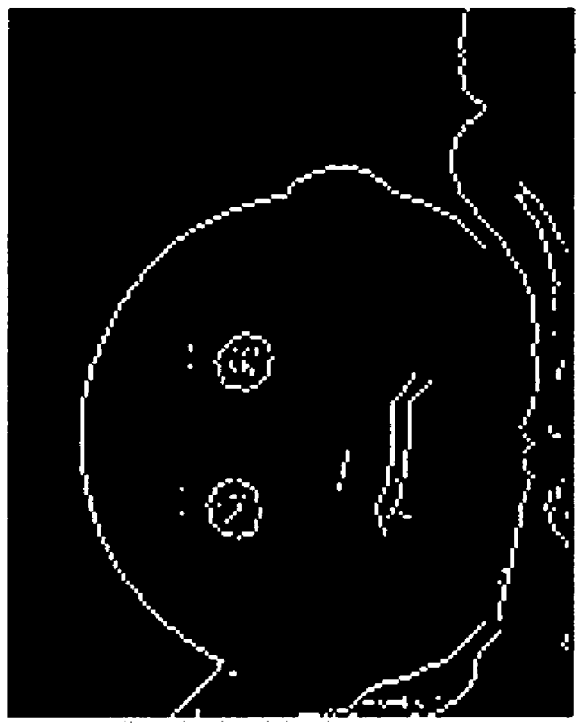
FIG. 6 is an illustration of an edge map obtained for an important area of an image.
Figure 5:
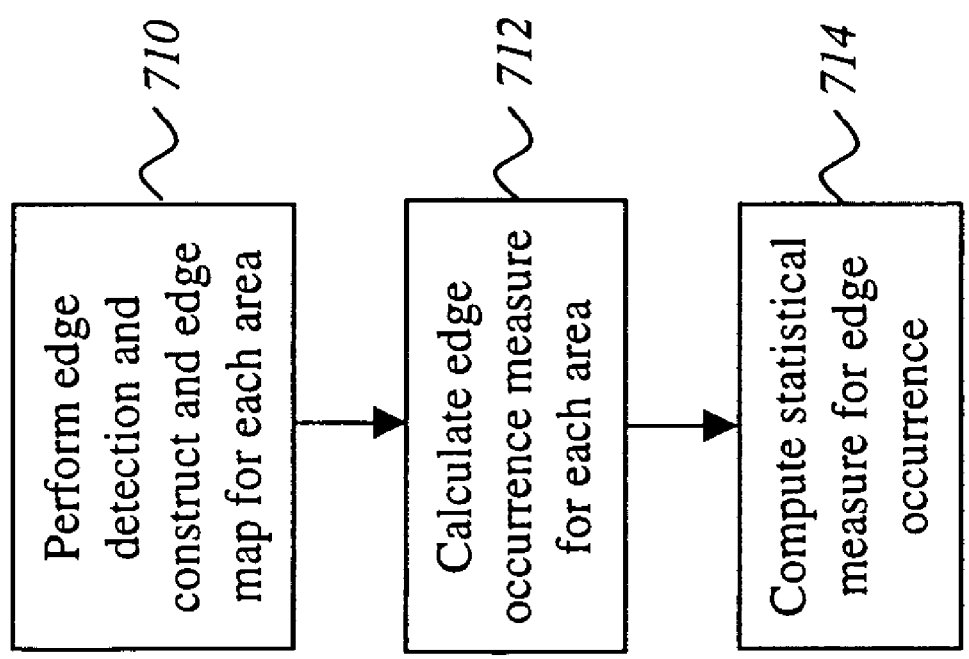
FIG. 5 is a flow diagram illustrating further detail of the method for calculating salient acceptability features, as shown in FIG. 3.

Next, referring back to FIG. 3, one or more salient acceptability features are calculated in step 218. Note that the processing occurring in step 218 is shown in greater detail in FIG. 5 for a preferred embodiment of the invention, in which an edge occurrence measure is employed as a salient acceptability feature. Accordingly, where the edge occurrence measure is used as a salient acceptability feature, edge maps are obtained in step 710 for the identified important areas in the input image by implementing an edge detection algorithm, such as the afore-mentioned Canny edge detection method. In alternative embodiments, different edge detection methods (such as the Sobel or Laplacian operators, or other available techniques) can be applied in step 710. The Canny edge detection method applied in step 710 may additionally utilize a smoothing filter designed to reduce the image noise, because the noise present in the identified important areas may impede the detection of the "true" edges by generating a number of "false" edges. A simple averaging filter with the kernel size of 5×5 is used in the preferred embodiment to account for this noise. It will be obvious, however, to those skilled in the art that other filtering operations can be readily implemented. In the preferred embodiment, the higher and lower thresholds for constructing the edge maps are set to identify strong edges having gradients higher than the $85^{th}$ percentile and weaker edges having gradients greater than 40% of the value for the higher threshold. The example of such an edge map constructed for one important area in an example image is shown in FIG. 6. The edge pixels are represented by white color, while non-edge pixels are painted in black.

Using the edge maps obtained in step 710, the measure of the edge occurrence is calculated for each area in step 712. One such measure, utilized in the preferred embodiment, represents the density of edge pixels. This measure is calculated as the ratio between the number of the edge pixels in the edge map for each area to the total number of pixels in the edge map for that area. The edge density computation helps to account for such factors as different sizes and resolution of input digital images. One example of input images having such different resolutions is scanned APS versus 35-mm film frames. In an alternative embodiment, the number of edge pixels may be used as the edge occurrence measure of step 712, especially when the input images have similar characteristics in terms of their resolution or size.

In step 714, a statistical measure of the edge occurrence over all selected area edge maps is computed. In the preferred method of the invention, the mean value of the edge occurrences, notably, the mean of the edge densities, computed in step 712 is used. Different statistical measures for the edge occurrence values (such as the median or the maximum value) can also be applied. In yet another alternative embodiment, a statistical measure can be constructed to utilize different measures of edge occurrence, such as the number of edge pixels in each area, rather than the edge density parameter.

Edge occurrence measure represents one example of a typical salient feature in an image that is essential for determining overall image acceptability due to sharpness problems. In alternative embodiments, other features can also be computed for the important areas, such as a statistical measure of a distribution for the gradient values, the Laplacian values, edge height, or edge width values, either separately or in a combination.

Other salient features, better suited for acceptability determination due to other factors, such as for example, noise, contrast, color rendering, overexposure, underexposure, as well as an objective quality measure with respect to important areas in the image, can also be identified using various existing techniques. Methods for identifying salient features for noise, contrast, sharpness, exposure and objective quality are disclosed in the afore-mentioned commonly assigned U.S. Pat. No. 6,535,636, which is incorporated herein by reference. Salient features that represents color rendering can be easily computed when the important areas of the image are identified using the main subject detection algorithm described above. In this case, those features represent statistical measures for hue, chroma (or saturation) or lightness distribution, separately or in a combination.

Referring back to FIG. 3, the calculated salient acceptability feature obtained in step 218 is compared with a predetermined threshold value in step 220. For example, and not meaning to imply any sort of limitation in the coverage of the invention, the salient acceptability feature obtained in step 218 is an edge occurrence measure in the preferred embodiment, and a useful threshold value for the edge occurrence measure, as represented by the mean edge density value, is the value of 0.0072. This threshold is determined in step 222 by analyzing a database of images that contains a variety of acceptable and unacceptable images. When the value for the selected salient acceptability feature is greater or equal than the threshold, the input image is classified as unacceptable for intended use, such as printing. If the selected salient acceptability feature is less than the threshold, the image is deemed suitable. Obviously, many other threshold values may be used depending on the situation, and no limitation is intended by the description of one such value.

In alternative embodiments where different salient acceptability features are computed for the important areas (such as a statistical measure of a distribution for the gradient values, the Laplacian values, edge height, or edge width values, separately or in a combination, or features reflecting noise, sharpness, contrast, color rendering, or objective quality), appropriate thresholds are determined in step 222 for the particular salient feature used.

Finally, based on the classification performed in step 220, a decision is made with respect to image usage in step 224, e.g. to enable one of the several predetermined output operations summarized in step 226. For example, an unacceptable image may be removed from a printing stage and not printed (step 226*a*). In the case of the use of the method according to the invention within a digital camera, the decision can be one of deleting the image, preferably in response to suggesting that the user delete the image (226*c*) and/or obtaining the user's approval, or suggesting that the user re-capture the scene (226*b*).

In other embodiments, instead of a single classification threshold, several classification thresholds can be established using the measure of edge occurrence to further separate printable images with low edge occurrence measures, which will benefit from applying algorithms (step 226*e*) to increase image sharpness. For example, the standard unsharp masking technique can be used. This technique is implemented in many commercially available software photo-editing and image enhancement packages, such as Adobe Photoshop software. In this case, after classifying images in step 220, a particular processing algorithm is automatically applied to increase the output image quality in step 226*e*, or suggested to the user as an option in a digital camera. If image processing is performed in step 226*e*, the acceptability check optionally can be redone on the processed image following the steps 210-226.

The invention has been described in detail with particular reference to certain preferred embodiments thereof, but it will be understood that variations and modifications can be effected within the spirit and scope of the invention.

The invention claimed is:

1. A method for automatically determining the acceptability of an input image for a predetermined output operation, said method comprising the steps of:
   (a) identifying one or more important areas in the input image;
   (b) calculating a salient acceptability feature for each of the important areas using image data;
   (c) automatically determining the acceptability of the input image from the salient acceptability features of the important areas; and
   (d) implementing the predetermined output operation based on the acceptability of the input image determined in step (c);
   wherein the input image is obtained from a digital camera, steps (a)-(d) are performed in the digital camera, and the output operation implemented in step (d) includes a deletion operation, whereby an input image found to be unacceptable is deleted.

2. The method as claimed in claim 1 wherein the one or more important areas are identified in step (a) by using a measure of edge occurrence to identify edge pixels in the image.

3. The method as claimed in claim 2 wherein the one or more important areas are identified in step (a) by identifying the areas with the greatest number of edge pixels.

4. The method as claimed in claim 2 wherein the one or more important areas that are identified in step (a) includes at least an area having an edge pixel with a maximum edge gradient.

5. The method as claimed in claim 2 wherein the one or more important areas that are identified in step (a) includes at least a central area of the input image.

6. The method as claimed in claim 1 wherein the one or more important areas are identified in step (a) by detecting one or more areas in the input image where the main subject is located.

7. The method as claimed in claim 1 wherein the one or more important areas are identified in step (a) by selecting one or areas in the input image based on coordinates provided by a human operator of the digital camera.

8. The method as claimed in claim 1, further comprising tracking the eye gaze of a user to determine eye fixations for each of one or more fixation areas in the input image, wherein the one or more important areas are identified in step (a) by detecting the one or more fixation areas in the input image that have the greatest number of eye fixations.

9. The method as claimed in claim 1 wherein the one or more important areas are identified in step (a) by algorithmically detecting one or more areas in the input image that have a human figure.

10. The method as claimed in claim 1 wherein the one or more important areas identified in step (a) comprise at least two areas of the input image.

11. The method as claimed in claim 1 wherein the salient acceptability feature is a measure of edge occurrence.

12. The method as claimed in claim 11 wherein the measure of edge occurrence is an edge density in the image data.

13. The method as claimed in claim 1 wherein the salient acceptability measure is selected from the group comprising edge occurrences, gradient values, Laplacian values, edge height values, edge width values, noise values, contrast values, color rendering values, overexposure values, and underexposure values derived from the input image.

14. The method as claimed in claim 1 wherein the step (c) of determining the acceptability of the input image from the salient acceptability features of the important areas comprises the step of using a statistical measure of the salient acceptability features over all the important areas.

15. The method as claimed in claim 14 wherein the salient acceptability feature is an edge density for each of the important areas and the statistical measure of the salient acceptability features is the mean of the edge densities over all the important areas.

16. The method as claimed in claim 1 wherein the output operation implemented in step (d) includes a printing operation, whereby an input image found to be unacceptable is not printed.

17. The method as claimed in claim 1 additionally comprising the step of suggesting to a camera user that the image be deleted and obtaining the user's approval for the deletion operation before deleting the image.

18. The method as claimed in claim 1 wherein the input image is obtained from a digital camera and the output operation implemented in step (d) includes instructing a camera operator to recapture the image.

19. The method as claimed in claim 1 wherein the output operation implemented in step (d) includes an image processing operation, whereby an input image found to be unacceptable is submitted to the image processing operation.

20. The method as claimed in claim 1 wherein step (a) comprises the steps of:
   detecting edge pixels that represent edges observed in the input image;
   obtaining an edge map of the edge pixels;
   dividing the edge map into a plurality of blocks, where each block may contain edge pixels from the edge map;
   identifying two or more blocks having the largest number of edge pixels; and
   selecting two or more important areas in the input image that correspond to the two or more blocks.

21. The method as claimed in claim 20 wherein step (b) comprises the step of calculating a salient acceptability feature based upon edge occurrence in each of the important areas.

22. The method as claimed in claim 21 wherein step (c) comprises the steps of calculating a statistical measure of edge occurrence from the salient acceptability features and using the statistical measure of edge occurrence to determine the acceptability of the digital input image for printing.

23. A system for automatically determining the acceptability of an input image for a predetermined output operation, said system comprising:
   an input stage for identifying one or more important areas in the input image;
   a processing stage for (a) calculating a salient acceptability feature for each of the important areas using image data and (b) automatically determining the acceptability of the input image from the salient acceptability features of the important areas; and an output stage for implementing the predetermined output operation based on the acceptability of the input image determined in the processing stage;

wherein the input image is obtained from a digital camera, the system is contained in the digital camera, and the output operation includes a deletion operation, whereby an input image found to be unacceptable is deleted.

24. The system as claimed in claim 23 wherein the input stage includes algorithms for (a) detecting edge pixels that represent edges observed in the input image; (b) obtaining an edge map of the edge pixels; (c) dividing the edge map into a plurality of blocks; (d) identifying two or more blocks having the largest number of edge pixels; and (e) selecting two or more important areas in the input image that correspond to the two or more blocks.

25. The system as claimed in claim 23 wherein the processing stage includes algorithms for (a) calculating a salient acceptability feature based upon edge occurrence in each of the important areas and (b) calculating a statistical measure of edge occurrence from the salient acceptability features and using the statistical measure of edge occurrence to determine the acceptability of the digital input image for printing.

26. The method of claim 1, wherein step d is performed automatically.

* * * * *

UNITED STATES PATENT AND TRADEMARK OFFICE
CERTIFICATE OF CORRECTION

PATENT NO. : 7,809,197 B2  Page 1 of 1
APPLICATION NO. : 11/008437
DATED : October 5, 2010
INVENTOR(S) : Fedorovskaya et al.

It is certified that error appears in the above-identified patent and that said Letters Patent is hereby corrected as shown below:

Title page, at Item (75) (inventor names), delete "James R. Niederbaumer, Webster, NY (US); Lorrie Claver" and insert -- James R. Niederbaumer, deceased, late of Webster, NY (US): by Lorrie Claver --.

Column 13, line 56 (claim 7), after "or" and before "areas" insert -- more --.

Column 16, line 12 (claim 26), delete "step d" and insert -- step (d) --.

Signed and Sealed this

Seventh Day of December, 2010

David J. Kappos
*Director of the United States Patent and Trademark Office*